(12) United States Patent
Bai et al.

(10) Patent No.: US 11,895,644 B2
(45) Date of Patent: Feb. 6, 2024

(54) INFORMATION TRANSMISSION METHOD, BASE STATION AND TERMINAL

(71) Applicant: DATANG MOBILE COMMUNICATIONS EQUIPMENT CO., LTD., Beijing (CN)

(72) Inventors: Wei Bai, Beijing (CN); Tony Ekpenyong, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 495 days.

(21) Appl. No.: 17/267,454

(22) PCT Filed: Aug. 9, 2019

(86) PCT No.: PCT/CN2019/099915
§ 371 (c)(1),
(2) Date: Feb. 9, 2021

(87) PCT Pub. No.: WO2020/030080
PCT Pub. Date: Feb. 13, 2020

(65) Prior Publication Data
US 2021/0314986 A1 Oct. 7, 2021

(30) Foreign Application Priority Data
Aug. 10, 2018 (CN) .......................... 201810912178.1

(51) Int. Cl.
*H04W 72/1268* (2023.01)
*H04W 72/23* (2023.01)
*H04L 1/1825* (2023.01)

(52) U.S. Cl.
CPC ....... *H04W 72/1268* (2013.01); *H04L 1/1825* (2013.01); *H04W 72/23* (2023.01)

(58) Field of Classification Search
CPC ............... H04W 56/005; H04W 56/00; H04W 72/1268; H04W 74/0833; H04W 74/0841;
(Continued)

(56) References Cited

U.S. PATENT DOCUMENTS

2004/0228320 A1* 11/2004 Laroia ................... H04L 1/1671
370/349
2014/0161002 A1* 6/2014 Gauvreau ............. H04L 5/0032
370/280
(Continued)

FOREIGN PATENT DOCUMENTS

CN 105792101 A 7/2016
CN 108024366 A 5/2018
(Continued)

OTHER PUBLICATIONS

International Search Report from PCT/CN2019/099915, dated Oct. 30, 2019, with English translation from WIPO.
(Continued)

Primary Examiner — Nathan S Taylor
(74) Attorney, Agent, or Firm — Ladas & Parry, LLP

(57) ABSTRACT

An information transmission method, a base station, and a terminal are provided. The method includes: acquiring a quantity of times of repeated transmissions of a terminal in a target configuration period; sending, to the terminal, Physical Downlink Control Channels for supplementary transmissions, if the quantity of times of repeated transmissions is less than a preset quantity of repeated-transmission times.

14 Claims, 5 Drawing Sheets

```
┌─────────────────────────────────────────────────────────┐
│ Acquiring a quantity of times of repeated transmissions │  21
│ of a terminal in a target configuration period          │
└─────────────────────────────────────────────────────────┘
                          │
                          ▼
┌─────────────────────────────────────────────────────────┐
│ If the quantity of the times of repeated transmissions  │
│ is smaller than a preset quantity of repeated-          │  22
│ transmission times, sending uplink dynamic scheduling   │
│ information for instructing supplementary transmissions │
│ to the terminal within a preset time duration after     │
│ start of a first repeated transmission of the terminal  │
│ in uplink transmission is detected and after completion │
│ of M times of repeated transmissions of the terminal    │
│ in the target configuration period is detected          │
└─────────────────────────────────────────────────────────┘
```

(58) Field of Classification Search
CPC . H04W 74/0866; H04W 74/08; H04W 72/12; H04W 72/23; G01S 13/003; G01S 13/765; G01S 13/767; G01S 13/87; G01S 13/00; G01S 13/76; G01S 5/02; H04L 43/0864; H04L 1/08; H04L 1/1825; H04L 1/18

See application file for complete search history.

(56) References Cited

U.S. PATENT DOCUMENTS

| | | | | |
|---|---|---|---|---|
| 2019/0097762 | A1* | 3/2019 | Jeon | H04L 1/1812 |
| 2019/0288820 | A1* | 9/2019 | Lyu | H04L 1/16 |
| 2019/0327751 | A1* | 10/2019 | Dong | H04L 5/0044 |
| 2019/0342053 | A1* | 11/2019 | Peng | H04L 1/1607 |
| 2019/0349116 | A1* | 11/2019 | Hosseini | H04W 72/23 |
| 2019/0357203 | A1 | 11/2019 | Xing et al. | |
| 2020/0021403 | A1* | 1/2020 | Zheng | H04L 1/08 |
| 2020/0059935 | A1 | 2/2020 | Qian et al. | |
| 2020/0228194 | A1* | 7/2020 | Hassan Hussein | H04B 7/18513 |
| 2020/0228288 | A1* | 7/2020 | Wu | H04L 5/0053 |
| 2020/0229151 | A1* | 7/2020 | Zhang | H04W 72/53 |
| 2020/0367234 | A1* | 11/2020 | Bergström | H04W 72/0446 |
| 2021/0006369 | A1* | 1/2021 | Bai | H04L 1/1819 |
| 2021/0045110 | A1* | 2/2021 | Fröberg Olsson | H04W 72/0446 |
| 2021/0120559 | A1* | 4/2021 | Li | H04L 5/0053 |

FOREIGN PATENT DOCUMENTS

| | | | |
|---|---|---|---|
| WO | 2018028702 A1 | 2/2018 | |
| WO | 2018127214 A1 | 7/2018 | |
| WO | WO-2019192330 A1 * | 10/2019 | H04L 1/08 |

OTHER PUBLICATIONS

Written Opinion of the International Searching Authority from PCT/CN2019/099915, dated Oct. 30, 2019, with English translation from WIPO.

International Preliminary Report on Patentability from PCT/CN2019/099915, dated Feb. 16, 2021, with English translation from WIPO.

Extended European Search Report from EP app. No. 19848063.4, dated Aug. 31, 2021, all pages.

Vivo, "Other aspects for URLLC", R1-1806078, 3GPP TSG RAN WG1 Meeting #93, Busan, Korea, May 21-25, 2018, all pages.

* cited by examiner

INFORMATION TRANSMISSION METHOD, BASE STATION AND TERMINAL

CROSS-REFERENCE TO RELATED APPLICATIONS

This application is a U.S. national phase application of a PCT Application No. PCT/CN2019/099915 filed on Aug. 9, 2019, which claims priority to Chinese Patent Application No. 201810912178.1 filed in China on Aug. 10, 2018, the disclosures of which are incorporated herein by reference in their entireties.

TECHNICAL FIELD

The present disclosure relates to the field of communications technologies, in particular, relates to an information transmission method, a base station and a terminal.

BACKGROUND

With development and change of mobile communication service demands, several organizations such as the Third Generation Partnership Project (3GPP) began to study a new wireless communication system (5 Generation New RAT, 5G NR). In a 5G NR system, an important demand is communication with low latency and high reliability, and some transmission schemes such as Ultra-Reliable and Low Latency Communications (URLLC) are presented.

For URLLC services, an uplink grant-free scheme can be supported in a NR standard to reduce air-interface transmission latency. Taking the uplink grant-free scheme as an example, a base station side first uses a radio resource control (Radio Resource Control, RRC) signaling to configure physical uplink shared channel (Physical Uplink Shared Channel, PUSCH) transmission, and after uplink grant-free transmission is activated, a terminal side performs the PUSCH transmission according to a configuration parameter in the RRC signaling (and a configuration parameter in an activation signaling).

In the RRC signaling, a period P, a repetition number K of resource allocation and K resource positions in the period of P are configured, and the K resource positions become K transmission occasions. In order for a base station to recognize K repeated transmissions of a same data block, NR specifies that multiple repeated transmissions of the same data can only be performed on resources configured in one period and cannot be performed across periods.

Arrival of data at the terminal-side is random, and when arrival time of the data is inconsistent with a configured first resource, that is to say, the data may not arrive before a first transmission occasion, uplink transmission for the URLLC will be partially cancelled, that is, resources semi-statically configured are insufficient to complete K repeated transmissions, the actual number of repeated transmissions in a period P is less than K, which will affect reliability of the PUSCH, such as performance of a block error ratio (Block Error Ratio, BLER) cannot meet a requirement.

SUMMARY

The present disclosure provides an information transmission method, a base station, and a terminal, which solve the problem of poor reliability during uplink transmission in the related art.

An information transmission method performed by a base station is provided in the embodiments of the present disclosure. The method includes: acquiring a quantity of times of repeated transmissions of a terminal in a target configuration period; sending, to the terminal, uplink dynamic scheduling information for instructing supplementary transmissions, if the quantity of times of repeated transmissions is less than a preset quantity of repeated-transmission times.

The uplink dynamic scheduling information includes an indication field for instructing the supplementary transmissions.

The uplink dynamic scheduling information is associated with a target indication field in an RRC signaling, the target indication field is used for instructing the terminal to perform the supplementary transmissions.

Sending, to the terminal, the uplink dynamic scheduling information for instructing the supplementary transmissions, includes: sending, to the terminal, the uplink dynamic scheduling information for instructing the supplementary transmissions, within a preset time duration after start of a first repeated transmission of the terminal in uplink transmission is detected and after completion of M times of repeated transmissions of the terminal in the target configuration period is detected, wherein M is the quantity of times of repeated transmissions of the terminal in the target configuration period, and M is an integer greater than zero.

Sending, to the terminal, the uplink dynamic scheduling information for instructing the supplementary transmissions within the preset time duration after the start of the first repeated transmission of the terminal in uplink transmission is detected and after the completion of the M times of repeated transmissions of the terminal in the target configuration period is detected, includes: sending, to the terminal, the uplink dynamic scheduling information for instructing the supplementary transmissions in the preset time duration after completion of the M times of repeated transmissions in the target configuration period is detected.

Sending, to the terminal, the uplink dynamic scheduling information for instructing the supplementary transmissions within the preset time duration after the start of the first repeated transmission of the terminal in uplink transmission is detected and after the completion of the M times of repeated transmissions of the terminal in the target configuration period is detected, includes: sending, to the terminal, the uplink dynamic scheduling information for instructing the supplementary transmissions after the start of the first repeated transmission of the terminal in the uplink transmission is detected and before the completion of M times of repeated transmissions of the terminal in the target configuration period is detected.

A quantity of times of the supplementary transmissions is a difference value between the preset quantity of repeated-transmission times and the quantity of times of repeated transmissions of the terminal in the target configuration period.

A quantity of times of the supplementary transmissions is configured by the base station, or determined by the terminal according to the uplink dynamic scheduling information.

A base station is further provided in the embodiments of the present disclosure. The base station includes a transceiver, a memory, a processor and a computer program stored on the memory and executable by the processor, wherein, when the processor executes the computer program, the processor performs the following steps: acquiring a quantity of times of repeated transmissions of a terminal in a target configuration period; sending, to the terminal, uplink dynamic scheduling information for instructing supplementary transmissions, if the quantity of times of repeated transmissions is less than a preset quantity of repeated-transmission times.

The uplink dynamic scheduling information includes an indication field for instructing the supplementary transmissions.

The uplink dynamic scheduling information is associated with a target indication field in radio resource control (RRC) signaling, the target indication field is used for instructing the terminal to perform the supplementary transmissions.

When the processor executes the computer program, the processor performs following steps: sending, to the terminal, the uplink dynamic scheduling information for instructing the supplementary transmissions, within a preset time duration after start of a first repeated transmission of the terminal in uplink transmission is detected and after completion of M times of repeated transmissions of the terminal in the target configuration period is detected, wherein M is the quantity of times of repeated transmissions of the terminal in the target configuration period, and M is an integer greater than zero.

When the processor executes the computer program, the processor performs following steps: sending, to the terminal, the uplink dynamic scheduling information for instructing the supplementary transmissions, in the preset time duration after completion of the M times of repeated transmissions in the target configuration period is detected.

When the processor executes the computer program, the processor performs following steps: sending, to the terminal, the uplink dynamic scheduling information for instructing the supplementary transmissions, after the start of the first repeated transmission of the terminal in the uplink transmission is detected and before the completion of M times of repeated transmissions of the terminal in the target configuration period is detected.

A quantity of times of the supplementary transmissions is a difference value between the preset quantity of repeated-transmission times and the quantity of times of repeated transmissions of the terminal in the target configuration period.

A quantity of times of the supplementary transmissions is configured by the base station, or determined by the terminal according to the uplink dynamic scheduling information.

A base station is further provided in the embodiments of the present disclosure. The base station includes: an acquisition module, configured for acquiring a quantity of times of repeated transmissions of a terminal in a target configuration period; a sending module, configured for sending, to the terminal, uplink dynamic scheduling information in a Physical Downlink Control Channel for instructing supplementary transmissions, if the quantity of times of repeated transmissions is less than a preset quantity of repeated-transmission times.

An information transmission method performed by a terminal is further provided in the embodiments of the present disclosure. The information transmission method includes: receiving, from a base station, uplink dynamic scheduling information for instructing supplementary transmissions wherein the uplink dynamic scheduling information is sent by the base station under a condition that a quantity of times of repeated transmissions of the terminal in the target configuration period is less than a preset quantity of repeated-transmission times; performing uplink supplementary transmissions according to the uplink dynamic scheduling information.

The uplink dynamic scheduling information includes an indication field for instructing the supplementary transmissions.

The uplink dynamic scheduling information is associated with a target indication field in an RRC signaling, and the target indication field is used for instructing the terminal to perform the supplementary transmissions.

Receiving, from the base station, the uplink dynamic scheduling information for instructing the supplementary transmissions, includes: receiving the uplink dynamic scheduling information for instructing the supplementary transmissions, the uplink dynamic scheduling information being sent by the base station within a preset time duration after start of a first repeated transmission of the terminal in uplink transmission is detected and after completion of M times of repeated transmissions of the terminal in the target configuration period is detected; wherein M is the quantity of times of repeated transmissions of the terminal in the target configuration period, and M is an integer greater than zero.

Receiving the uplink dynamic scheduling information for instructing the supplementary transmissions, the uplink dynamic scheduling information being sent by the base station within the preset time duration after the start of the first repeated transmission of the terminal in uplink transmission is detected and after the completion of the M times of repeated transmissions of the terminal in the target configuration period is detected, includes: receiving the uplink dynamic scheduling information for instructing the supplementary transmissions, the uplink dynamic scheduling information being sent by the base station in the preset time duration after completion of the M times of repeated transmissions in the target configuration period is detected.

Receiving the uplink dynamic scheduling information for instructing the supplementary transmissions, the uplink dynamic scheduling information being sent by the base station within the preset time duration after the start of the first repeated transmission of the terminal in uplink transmission is detected and after the completion of the M times of repeated transmissions of the terminal in the target configuration period is detected, includes: receiving the uplink dynamic scheduling information for instructing the supplementary transmissions, the uplink dynamic scheduling information being sent by the base station after the start of the first repeated transmission of the terminal in the uplink transmission is detected and before the completion of M times of repeated transmissions of the terminal in the target configuration period is detected.

A quantity of times of the supplementary transmissions is a difference value between the preset quantity of repeated-transmission times and the quantity of times of repeated transmissions of the terminal in the target configuration period.

A quantity of times of the supplementary transmissions is configured by the base station, or determined by the terminal according to the uplink dynamic scheduling information.

A terminal is further provided in the embodiments of the present disclosure. The terminal includes: a transceiver, a memory, a processor and a computer program stored on the memory and executable by the processor, wherein, when the processor executes the computer program, the processor performs the following steps: receiving, from a base station, uplink dynamic scheduling information for instructing supplementary transmissions wherein the uplink dynamic scheduling information is sent by the base station under a condition that a quantity of times of repeated transmissions of the terminal in the target configuration period is less than a preset quantity of repeated-transmission times; performing uplink supplementary transmissions according to the uplink dynamic scheduling information.

The uplink dynamic scheduling information includes an indication field for instructing the supplementary transmissions.

The uplink dynamic scheduling information is associated with a target indication field in an RRC signaling, and the target indication field is used for instructing the terminal to perform the supplementary transmissions.

When the processor executes the computer program, the processor performs the following steps: receiving the uplink dynamic scheduling information for instructing the supplementary transmissions, the uplink dynamic scheduling information being sent by the base station within a preset time duration after start of a first repeated transmission of the terminal in uplink transmission is detected and after completion of M times of repeated transmissions of the terminal in the target configuration period is detected; wherein M is the quantity of times of repeated transmissions of the terminal in the target configuration period, and M is an integer greater than zero.

When the processor executes the computer program, the processor performs the following steps: receiving the uplink dynamic scheduling information for instructing the supplementary transmissions, the uplink dynamic scheduling information being sent by the base station in the preset time duration after completion of the M times of repeated transmissions in the target configuration period is detected.

When the processor executes the computer program, the processor performs the following steps: receiving the uplink dynamic scheduling information for instructing the supplementary transmissions, the uplink dynamic scheduling information being sent by the base station after the start of the first repeated transmission of the terminal in the uplink transmission is detected and before the completion of M times of repeated transmissions of the terminal in the target configuration period is detected.

A quantity of times of the supplementary transmissions is a difference value between the preset quantity of repeated-transmission times and the quantity of times of repeated transmissions of the terminal in the target configuration period.

A quantity of times of the supplementary transmissions is configured by the base station, or determined by the terminal according to the uplink dynamic scheduling information.

A terminal is further provided in the embodiments of the present disclosure. The terminal includes: a receiving module, configured for receiving, from a base station, uplink dynamic scheduling information for instructing supplementary transmissions wherein the uplink dynamic scheduling information is sent by the base station under a condition that a quantity of times of repeated transmissions of the terminal in the target configuration period is less than a preset quantity of repeated-transmission times; a processing module, configured for performing uplink supplementary transmissions according to the uplink dynamic scheduling information.

The technical solutions of the present disclosure have the beneficial effects as follow: by acquiring the quantity of times of repeated transmissions of the terminal in the target configuration period, and when the quantity of times of repeated transmissions is less than the preset quantity of repeated-transmission times, sending the uplink dynamic scheduling information for instructing the terminal to perform supplementary transmissions, the supplementary transmissions are performed by means of dynamic scheduling when a quantity of transmission times of the terminal in the target configuration period is less than the preset quantity of repeated-transmission times, so that a situation that reliability of uplink transmission is influenced because the quantity of transmission times of the terminal in the target configuration period is less than the preset quantity of repeated-transmission times may be avoided, so that the reliability of the URLLC service is guaranteed.

BRIEF DESCRIPTION OF THE DRAWINGS

In order to more clearly illustrate technical solutions of embodiments of the present disclosure, drawings used in description of the embodiments will be briefly described below, and it is obvious that the drawings in the following description are only some embodiments of the present disclosure, and other drawings can be obtained by those skilled in the art without involving any inventive effort.

DETAILED DESCRIPTION

Figure 1:
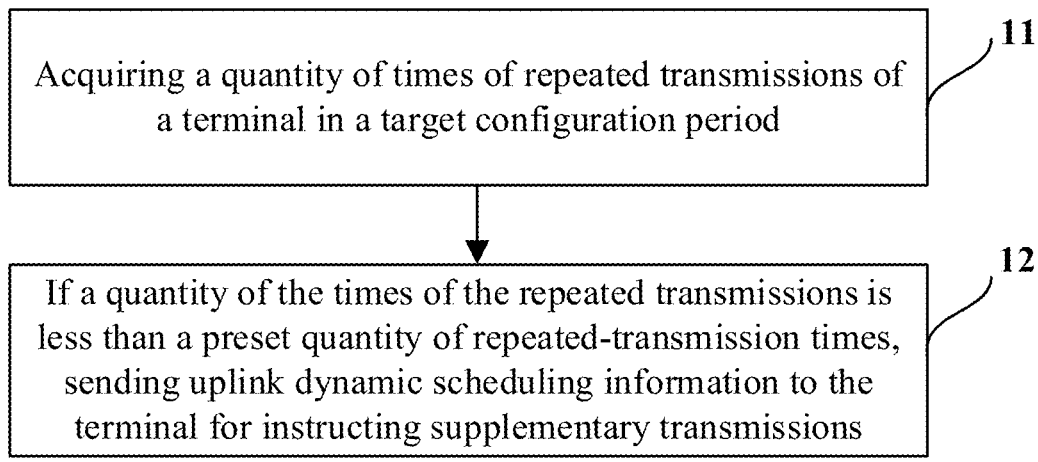
FIG. 1 shows a first flow chart of an information transmission method at a base station side provided by an embodiment of the present disclosure.

To make problems to be addressed, the technical solutions and advantages of the present disclosure clearer, detailed description will be provided below in connection with the drawings and specific embodiments. In the following description, specific details such as particular configurations and components are provided only to facilitate thorough understanding of embodiments of the present disclosure. Accordingly, it will be apparent to those skilled in the art that various changes and modifications may be made to the embodiments described herein without departing from the scope and the spirit of the present disclosure. In addition, descriptions of well-known functions and constructions are omitted for clarity and conciseness.

It should be appreciated that reference throughout this specification to "one embodiment" or "an embodiment" means that a particular feature, structure, or characteristic described in connection with the embodiment is included in at least one embodiment of the present disclosure. Thus, appearances of phrases "in one embodiment" or "in an embodiment" in various places throughout this specification are not necessarily all referring to the same embodiment. Furthermore, particular features, structures, or characteristics may be combined in any suitable manner in one or more embodiments.

In the various embodiments of the present disclosure, it should be understood that values of serial numbers of processes described below are not meant to imply an order of execution, but rather that the order of execution of the processes should be determined by functions and inherent logic thereof and should not be construed as limiting implementation of the embodiments of the present disclosure in any way.

Additionally, such terms "system" and "network" are often used interchangeably herein.

In the embodiments provided herein, it should be understood that "B corresponding to A" means that B is associated with A and B can be determined from A. However, it should also be understood that determining B from A does not mean determining B from A only, but B may also be determined from A and/or other information.

In the embodiments of the present disclosure, forms of access networks are not limited, and may include access networks such as a Macro Base Station, a Micro Base Station, a Node B (i.e. a 3G mobile base station), and an enhanced Node B (eNB), a Home enhanced base station (Femto eNB or Home eNode B or Home eNB or HeNB), a relay station, an access point, an RRU (Remote Radio Unit), an RRH (Remote Radio Head), etc. A user terminal may be a mobile telephone (or cell phone) or other device capable of transmitting or receiving wireless signals, including user equipment, a personal digital assistant (PDA), a wireless modem, a wireless communication device, a handheld device, a laptop computer, a cordless telephone, a wireless local loop (WLL) station, a CPE (Customer Premise Equipment) or a mobile intelligent hotspot capable of converting a mobile signal into a WiFi signal, an intelligent household appliance, or other equipment capable of autonomously communicating with a mobile communication network without human operation, etc.

Specifically, the embodiments of the present disclosure provide an information transmission method which solves the problem of poor reliability in uplink transmission in the related art.

As shown in FIG. 1, an embodiment of the present disclosure provides an information transmission method, specifically the method includes the following steps 11-12.

Step 11: acquiring a quantity of times of repeated transmissions of a terminal in a target configuration period.

Before the step 11, the method further includes: configuring the quantity of the times of repeated transmissions in one configuration period to the terminal.

Specifically, taking PUSCH transmission as an example, the base station configures parameters such as a period, K transmission occasions (TO) within one period, and a Redundancy Version (RV) through a first parameter in an RRC signaling. For example, the first parameter may be a parameter in a configured grant configuration (ConfiguredGrantConfig).

The step 11 above specifically includes: detecting a position of a transmission occasion, in a target configuration period, of a first repeated transmission of the terminal in uplink transmission; and calculating a quantity of the times of repeated transmissions of the terminal in the target configuration period according to the position of the transmission occasion.

Because arrival of data at the terminal side is random, the base station calculates the quantity of the times of repeated transmissions of the terminal in the target configuration period according to a configured quantity of times of repeated transmissions and a configured RV sequence, and in the following table 1, different quantities K of times of repeated transmissions are configured in an URLLC uplink grant-free transmission scheme, and corresponding transmission schemes are provided corresponding to different RV configurations.

TABLE 1

|   | RV = {0 0 0 0} | RV = {0 3 0 3} | RV = {0 2 3 1} |
|---|---|---|---|
| K = 1 | {0} | {0} | {0} |
| K = 2 | {0 0} if start from $1^{st}$ TO<br>{0} if start from $2^{nd}$ TO | {0 3} always start from $1^{st}$ TO | {0 2} always start from $1^{st}$ TO |
| K = 4 | {0 0 0 0} if start from $1^{st}$ TO<br>{0 0 0} if start from $2^{nd}$ TO<br>{0 0} if start from $3^{rd}$ TO<br>{0} if start from $4^{th}$ TO | {0 3 0 3} if start from $1^{st}$ TO<br>{0 3 } if start from $3^{rd}$ TO | {0 2 3 1} always start from $1^{st}$ TO |
| K = 8 | {0 0 0 0 0 0 0 0} if start from $1^{st}$ TO<br>{0 0 0 0 0 0 0} if start from $2^{nd}$ TO<br>{0 0 0 0 0 0} if start from $3^{rd}$ TO<br>{0 0 0 0 0} if start from $4^{th}$ TO<br>{0 0 0 0} if start from $5^{th}$ TO<br>{0 0 0} if start from $6^{th}$ TO<br>{0 0} if start from $7^{th}$ TO | {0 3 0 3 0 3 0 3} if start from $1^{st}$ TO<br>{0 3 0 3 0 3} if start from $3^{rd}$ TO<br>{0 3 0 3} if start from $5^{th}$ TO<br>{0 3} if start from $7^{th}$ TO | {0 2 3 1 0 2 3 1} always start from $1^{st}$ TO |

Taking the K=4 and RV={0 3 0 3} in Table 1 as an example, wherein elements 0, 1, 2, and 3 in the RV sequence represent different transmission schemes, and a time domain resource position is {an initial time domain symbol, the number of time domain symbols}, such as: the time domain symbols can be OFDM symbols. This time domain resource position is defined as one transmission occasion TO, which means one repeated transmission is completed, K=4 means that four TOs are required for four repeated transmissions. The TO is typically continuous in time domain.

When arriving before the first transmission occasion TO, data can be transmitted by using the first transmission occasion TO, in this way, may be transmitted for four times in the target configuration period, and RV is {0 3 0 3}; when arriving after the first transmission occasion TO and before the third transmission occasion TO, the data can be transmitted by using the third transmission occasion TO, in this way, may be transmitted twice in the target configuration period, and RV is {0 3}; and when arriving after the third transmission occasion TO, the data will not be transmitted in the target configuration period.

Step 12: if a quantity of the times of the repeated transmissions is less than a preset quantity of repeated-transmission times, sending uplink dynamic scheduling information to the terminal for instructing supplementary transmissions.

The preset quantity of repeated-transmission times can be a quantity of times of repeated transmissions, in one period, configured to the terminal by the base station. Transmitting the uplink dynamic scheduling information to the terminal for instructing the supplementary transmissions may specifically be transmitting a physical downlink control channel (PDCCH) to the terminal for instructing the supplementary transmissions.

The uplink dynamic scheduling information includes an indication field for instructing supplementary transmissions, or the uplink dynamic scheduling information is associated with a target indication field in an RRC signaling, and the target indication field is used for instructing the terminal to perform supplementary transmissions.

Instructing the terminal to perform supplementary transmissions means instructing the terminal to complement insufficient repeated transmissions which do not reach the preset quantity of repeated-transmission times when the quantity of the times of repeated transmissions of the terminal in the target configuration period is less than the preset quantity of repeated-transmission times.

A quantity of times of supplementary transmissions can be difference between the preset quantity of repeated-transmission times and the quantity of the times of repeated transmissions of the terminal in the target configuration period. The quantity of times of the supplementary transmissions may also be configured by the base station or determined by the terminal based on the uplink dynamic scheduling information.

In this embodiment, by acquiring the quantity of the times of repeated transmissions of the terminal in the target configuration period, and when the quantity of the times of repeated transmissions is less than the preset quantity of repeated-transmission times, sending the uplink dynamic scheduling information for instructing the terminal to perform supplementary transmissions, the supplementary transmissions are performed by means of dynamic scheduling when a quantity of transmission times of the terminal in the target configuration period are less than the preset quantity of repeated-transmission times, so that a situation that reliability of uplink transmission is influenced because the quantity of transmission times of the terminal in the target configuration period is less than the preset quantity of repeated-transmission times may be avoided, so that the reliability of the URLLC service is guaranteed.

Figure 2:
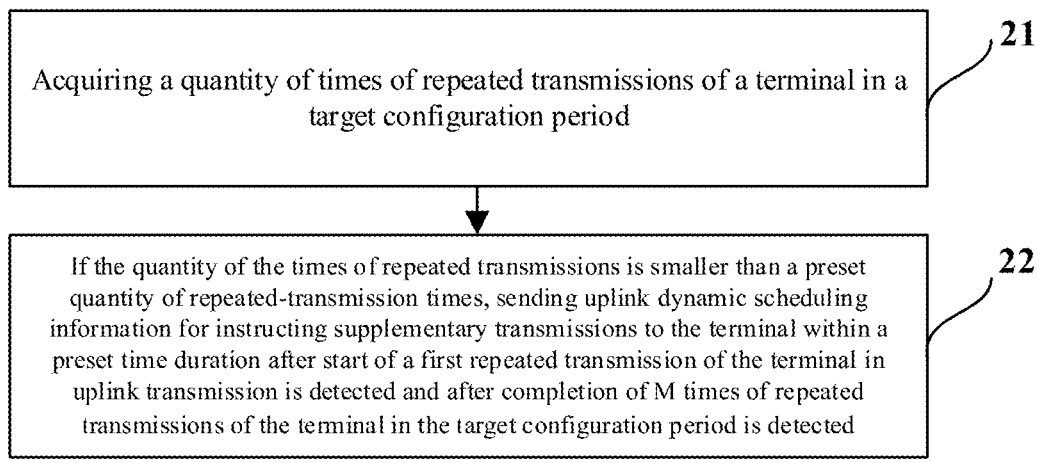
FIG. 2 shows a second flow chart of an information transmission method at the base station side provided by an embodiment of the present disclosure.

As shown in FIG. 2, an embodiment of the present disclosure provides an information transmission method, specifically the information transmission method includes the following steps 21-22.

Step 21: acquiring a quantity of times of repeated transmissions of a terminal in a target configuration period.

Step 22: if the quantity of the times of repeated transmissions is smaller than preset quantity of repeated-transmission times, sending uplink dynamic scheduling information for instructing the terminal to perform supplementary transmissions within a preset time duration after a first repeated transmission of the terminal in uplink transmission is started and completion of M times of repeated transmissions of the terminal in the target configuration period is detected.

M is the number of times of repeated transmissions of the terminal in the target configuration period, and M is an integer greater than zero.

The above step 22 is described below in connection with specific application scenarios:

Scenario 1: sending the uplink dynamic scheduling information for instructing the terminal to perform supplementary transmissions within a preset time duration after completion of M times of repeated transmissions of the terminal in the target configuration period is detected.

A quantity of times of supplementary transmissions can be difference between the preset quantity of repeated-transmission times and the quantity of the times of repeated transmissions of the terminal in the target configuration period. The quantity of times of the supplementary transmissions may also be configured by the base station or determined by the terminal based on the uplink dynamic scheduling information.

Specifically, taking the preset quantity of repeated-transmission times is K, K=4 and RV={0 3 0 3} as an example, wherein elements 0, 1, 2, and 3 in the RV sequence represent different transmission schemes, and a time domain resource position is {an initial time domain symbol, the number of time domain symbols}, such as: the time domain symbols can be OFDM symbols. This time domain resource position is defined as one transmission occasion TO, which means one repeated transmission is completed, K=4 means that four TOs are required for four repeated transmissions. The TOs are typically continuous herein. A resource mapping schematic diagram for uplink supplementary transmissions in scenario 1 is shown in FIG. 9.

Figure 9:
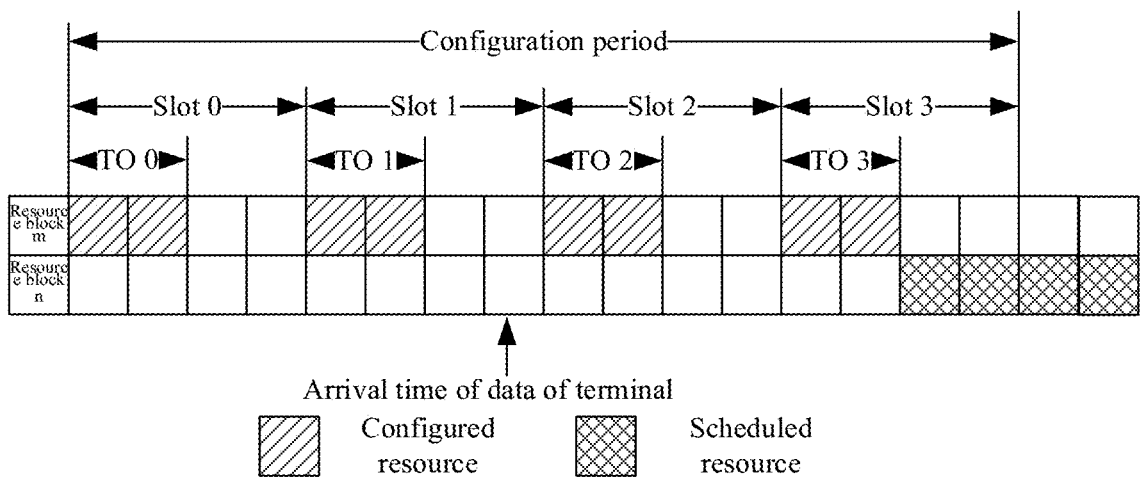
FIG. 9 shows a resource mapping schematic diagram for uplink supplementary transmission in a first scenario provided by an embodiment of the present disclosure.

If an uplink packet of the terminal arrives after a second transmission occasion TO and before a third transmission occasion TO in one configuration period, then the terminal will transmit a PUSCH with RV=0 on the third transmission occasion TO (i.e. TO2 in FIG. 9), transmit a PUSCH with RV=3 on a fourth transmission occasion TO (i.e. TO3 in FIG. 9). The base station blindly detects the PUSCHs. Normally, the PUSCHs with RV=0 and RV=3 should be detected on the third transmission occasion TO and the fourth transmission occasion TO.

The base station can knows the quantity M of times of repeated transmissions actually completed by the terminal in the target configuration period is 2 (M=2), according to the detected transmission occasion of the first repeated transmission, namely TO2. The base station and the terminal know the quantity of the times of supplementary repeated transmissions by: calculating that the quantity of times of supplementary repeated transmissions required to be performed is N=K−M=2 according to the configured quantity K of times of repeated transmissions (K=4) in one configuration period and the quantity M of times of repeated transmissions (M=2) actually completed in the target configuration period.

The base station selects a sending time moment to send an uplink grant (UL grant) for scheduling the terminal to perform the supplementary transmission of PUSCHs. The sending time moment is the moment when the base station considers that M times of repeated transmissions of the terminal in the target configuration period are completed, or is within a preset time duration after the terminal completes M times of repeated transmissions in the target configuration period. In this way, when the terminal completes the M times of repeated transmissions in the target configuration period, or within the preset time duration after the terminal completes the M times of repeated transmissions in the target configuration period, the terminal continuously performs supplementary repeated transmissions on scheduled resources according to instruction information of the UL grant and an obtained quantity of times of supplementary repeated transmissions, wherein the quantity N of times of supplementary repeated transmissions is 2 (N=2) calculated in advance. The preset time duration is set for being distinguished from uplink dynamic scheduling information used for instructing retransmission or uplink dynamic scheduling information used for instructing dynamic transmission.

Of course, the quantity of times of the supplementary transmissions may also be configured by the base station or determined by the terminal based on the uplink dynamic scheduling information. The base station may configure the quantity L of times of supplementary repeated transmissions to the terminal through the RRC signaling or DCI. The L is an integer greater than zero. In this way, when the terminal completes the M times of repeated transmissions in the target configuration period, or within the preset time duration after the terminal completes the M times of repeated transmissions in the target configuration period, the terminal continues to perform the supplementary repeated transmissions on the scheduled resources according to the configured quantity of times of supplementary repeated transmissions or according to the quantity of times of supplementary repeated transmissions determined by the uplink dynamic scheduling information.

Typically, after the terminal transmits M=2 repeated transmissions on two configured transmission occasions TOs, two repeated transmissions are completed in the first and the second supplementary repeated transmissions using RV=0 and RV=3, respectively.

In the embodiment, the base station can instruct the terminal to perform the supplementary repeated transmissions in the preset time duration after completion of the M times of repeated transmissions of the terminal in the target configuration period is detected, consequently, a case that the reliability of the uplink transmission is influenced because the quantity of transmission times of the terminal in the target configuration period is less than the preset quantity of repeated-transmission times may be avoided, and the M times of repeated transmissions of the terminal in the target configuration period cannot be influenced, consequently, the reliability of the URLLC service is guaranteed.

Scenario 2: sending the uplink dynamic scheduling information to the terminal for instructing supplementary transmissions, after starting of the first repeated transmission of the terminal in uplink transmission is detected and before completion of the M times of repeated transmissions of the terminal within the target configuration period is detected.

The quantity of times of the supplementary transmissions can be a difference value between the preset quantity of repeated-transmission times and the quantity of times of repeated transmissions of the terminal in the target configuration period. The quantity of times of the supplementary transmissions may also be configured by the base station or determined by the terminal based on the uplink dynamic scheduling information.

Specifically, taking the preset quantity of repeated-transmission times is K, K=4 and RV={0 3 0 3} as an example, wherein elements 0, 1, 2, and 3 in the RV sequence represent different transmission schemes, and a time domain resource position is {an initial time domain symbol, the number of time domain symbols}, such as: the time domain symbols can be OFDM symbols. This time domain resource position is defined as one transmission occasion TO, which means one repeated transmission is completed, K=4 means that four TOs are required for four repeated transmissions. The TOs are typically continuous herein. A resource mapping schematic diagram for uplink supplementary transmissions in scenario 2 is shown in FIG. 10.

Figure 10:
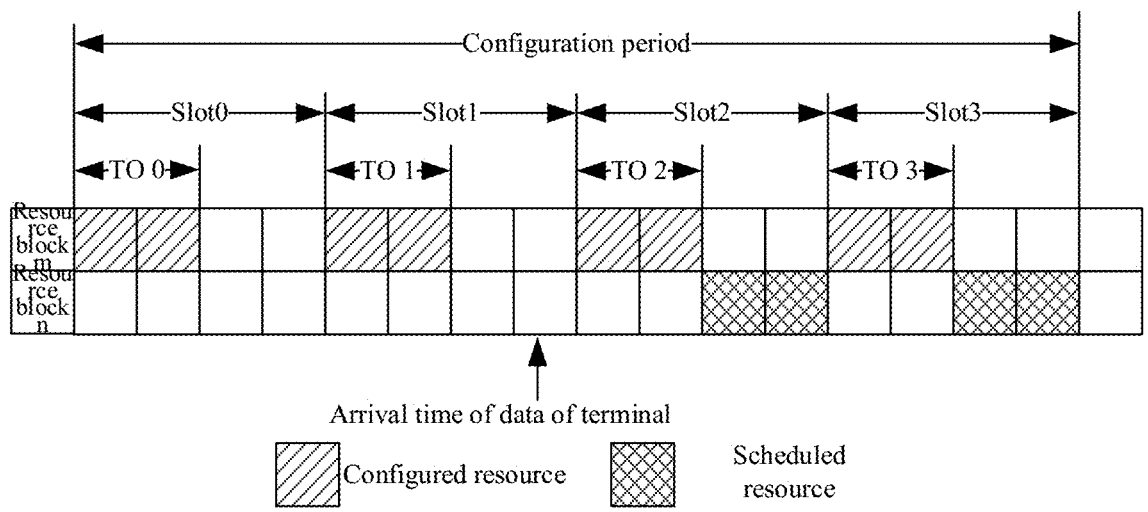
FIG. 10 shows a resource mapping schematic diagram for uplink supplementary transmission in a second scenario provided by an embodiment of the present disclosure.

If an uplink packet of the terminal arrives after the second transmission occasion TO and before the third transmission occasion TO in one configuration period, then the terminal will transmit a PUSCH with RV=0 on the third transmission occasion TO (i.e. TO2 in FIG. 10), transmit a PUSCH with RV=3 on a fourth transmission occasion TO (i.e. TO3 in FIG. 10). The base station blindly detects the PUSCHs. Normally, the PUSCHs with RV=0 and RV=3 should be detected on the third transmission occasion TO and the fourth transmission occasion TO.

The base station can knows the quantity M of times of repeated transmissions actually completed by the terminal in the target configuration period is 2 (M=2), according to the detected transmission occasion of the first repeated transmission, namely TO2. The base station and the terminal know the quantity of the times of supplementary repeated transmissions by: calculating that the quantity of times of supplementary repeated transmissions required to be performed is N=K−M=2 according to the configured quantity K of times of repeated transmissions (K=4) in one configuration period and the quantity M of times of repeated transmissions (M=2) actually completed in the target configuration period.

The base station selects a sending time moment to send a UL grant for scheduling the terminal to perform supplementary transmissions of PUSCHs. The sending time moment is the moment when the base station detects the first repeated transmission or after the base station detects the first repeated transmission, and before M times of repeated transmissions of the terminal in the target configuration period are completed. In this way, in a process of performing the M times of repeated transmissions in the target configuration period by the terminal, the terminal simultaneously performs supplementary repeated transmissions on scheduled resources according to instruction information of the UL grant and an obtained quantity of times of supplementary repeated transmissions, the quantity N of times of supplementary repeated transmissions is 2 (N=2) calculated in advance.

Of course, the quantity of times of the supplementary transmissions may also be configured by the base station or determined by the terminal based on the uplink dynamic scheduling information. The base station may configure the quantity L of times of supplementary repeated transmissions to the terminal through the RRC signaling or DCI. The L is an integer greater than zero. In this way, in a process of performing the M times of repeated transmissions in the target configuration period by the terminal, the terminal simultaneously performs the supplementary repeated transmissions on the scheduled resources according to the configured quantity of times of supplementary repeated transmissions or according to the quantity of times of supplementary repeated transmissions determined by the uplink dynamic scheduling information.

Typically, after the terminal transmits M=2 repeated transmissions on two configured transmission occasions TOs, two repeated transmissions are completed in the first and the second supplementary repeated transmissions using RV=0 and RV=3, respectively.

In the embodiment, the base station can instruct the terminal to perform the supplementary repeated transmissions after the first repeated transmission of the terminal in the uplink transmission is detected and before completion of the M times of repeated transmission of the terminal in the target configuration period is completed, thereby a condition that the reliability of the uplink transmission is influenced because the quantity of transmission times of the terminal in the target configuration period is less than the preset quantity of repeated-transmission times may be avoided, consequently, the reliability of the URLLC service is guaranteed, and delay of the uplink transmission may also be avoided.

In the above technical solutions, uplink dynamic scheduling information for instructing supplementary transmissions is sent to the terminal by acquiring the quantity of the times of repeated transmissions of the terminal in the target configuration period, and under a condition that the quantity of the times of repeated transmissions is less than the preset quantity of repeated-transmission times, so that under a condition that the quantity of the times of repeated transmissions in the target configuration period is less than the preset quantity of repeated-transmission times, the terminal performs supplementary transmissions based on dynamic scheduling from the base station, and a condition that reliability of uplink transmission is influenced because the quantity of transmission times of the terminal in the target configuration period is less than the preset quantity of repeated-transmission times may be avoided, consequently, the reliability of the URLLC service is guaranteed.

The information transmission methods of the present disclosure are described above, a base station corresponding to the methods will be further illustrated in this embodiment in conjunction with the accompanying drawings.

Figure 3:
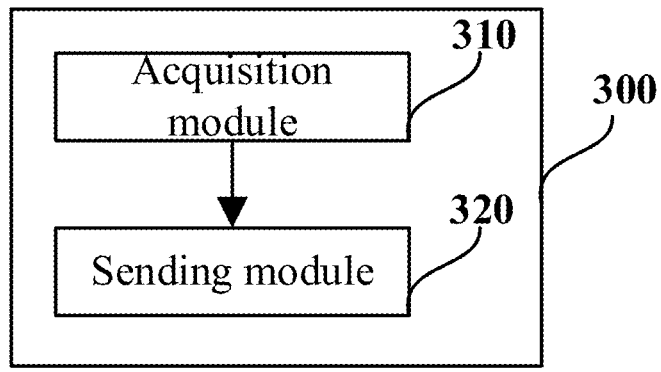
FIG. 3 shows a structural schematic diagram of modules of a base station provided by an embodiment of the present disclosure.

Specifically, as shown in FIG. 3, a base station 300 provided by an embodiment of the present disclosure includes an acquisition module 310 and a sending module 320.

The acquisition module 310 is configured for acquiring a quantity of times of repeated transmissions of a terminal in a target configuration period.

The sending module 320 is configured for sending uplink dynamic scheduling information for instructing the terminal to perform supplementary transmissions, in a case that the quantity of the times of repeated transmissions is less than the preset quantity of repeated-transmission times.

The uplink dynamic scheduling information includes an indication field for instructing supplementary transmissions.

The uplink dynamic scheduling information is associated with a target indication field in an RRC signaling, and the target indication field is used for instructing the terminal to perform supplementary transmissions.

The sending module 320 includes a first sending submodule.

The first sending submodule is configured for sending the uplink dynamic scheduling information for instructing the terminal to perform supplementary transmissions within a preset time duration after completion of M times of repeated transmissions of the terminal in the target configuration period is detected and after start of a first repeated transmission of the terminal in uplink transmission is detected; wherein, M is the quantity of the quantity of the times of repeated transmissions of the terminal in the target configuration period, and M is an integer greater than zero.

The first sending submodule includes a first sending unit, the first sending unit is configured for sending the uplink dynamic scheduling information for instructing the terminal to perform supplementary transmissions, within a preset time duration after completion of M times of repeated transmissions of the terminal in the target configuration period is detected.

The first sending submodule includes a second sending submodule, the second sending unit is configured for sending the uplink dynamic scheduling information for instructing the terminal to perform supplementary transmissions to the terminal after start of a first repeated transmission of the terminal in uplink transmission is detected and before completion of the M times of repeated transmissions of the terminal within the target configuration period is detected.

A quantity of times of supplementary transmissions can be difference between the preset quantity of repeated-transmission times and the quantity of the times of repeated transmissions of the terminal in the target configuration period. The quantity of times of the supplementary transmissions may be configured by the base station or determined by the terminal based on the uplink dynamic scheduling information.

The embodiment of the base station in the present disclosure corresponds to the embodiment of the method provided above, all implementation details in the embodiment of the method are suitable for the embodiment of the base station, and the same technical effect can be achieved.

In the base station 300 in the present disclosure, by acquiring the quantity of the times of repeated transmissions of the terminal in the target configuration period, and when the quantity of the times of repeated transmissions is less than the preset quantity of repeated-transmission times, sending the uplink dynamic scheduling information for instructing the terminal to perform supplementary transmissions, the supplementary transmissions are performed by means of dynamic scheduling when the quantity of transmission times of the terminal in the target configuration period is less than the preset quantity of repeated-transmission times, so that a condition that reliability of uplink transmission is influenced because the quantity of transmission times of the terminal in the target configuration period is less than the preset quantity of repeated-transmission times may be avoided, so that the reliability of the URLLC service is guaranteed.

Figure 4:
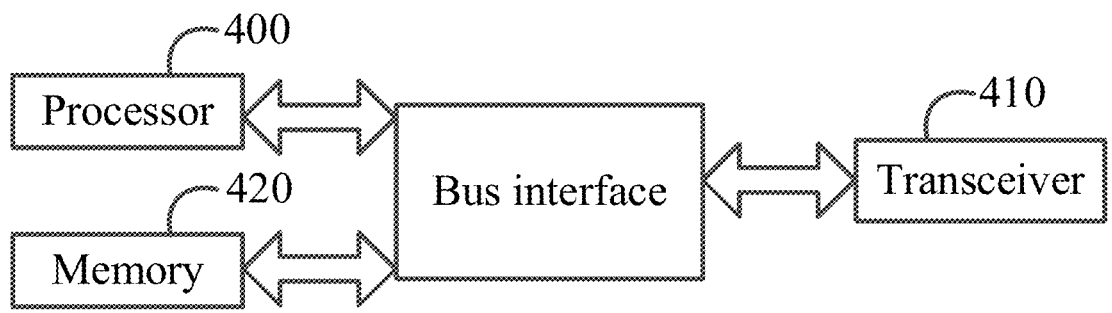
FIG. 4 shows a block diagram of a base station provided by an embodiment of the present disclosure.

In order to better achieve the above objectives, as shown in FIG. 4, the embodiments of the present disclosure also provide a base station. The base station includes: a processor 400; a memory 420 connected to the processor 400 via a bus interface, and a transceiver 410 connected to the processor 400 via a bus interface; the memory 420 is configured to store programs and data used by the processor when performing operations; data information or pilots are transmitted through the transceiver 410, and an uplink control channel is also received through the transceiver 410; and when the processor 400 calls and executes the programs and data stored in the memory 420, the following functions are realized.

The processor 400 is configured for reading the programs in the memory 420 and executes the following steps: acquiring a quantity of times of repeated transmissions of the terminal in the target configuration period; and if the quantity of the times of repeated transmissions is less than the preset quantity of repeated-transmission times, sending uplink dynamic scheduling information for instructing the terminal to perform supplementary transmissions to the terminal.

The uplink dynamic scheduling information includes an indication field for instructing supplementary transmissions.

The uplink dynamic scheduling information is associated with a target indication field in an RRC signaling, and the target indication field is used for instructing the terminal to perform supplementary transmissions.

When the processor 400 executes the computer program, the processor 400 implements the following steps: sending uplink dynamic scheduling information for instructing the terminal to perform supplementary transmissions to the terminal, after start of a first repeated transmission of the terminal in uplink transmission is detected and within a preset time duration after completion of M times of repeated transmissions of the terminal in the target configuration period is detected; wherein, M is the number of times of repeated transmissions of the terminal in the target configuration period, and M is an integer greater than zero.

When the processor 400 executes the computer program, the processor 400 performs the following steps: sending uplink dynamic scheduling information for instructing the terminal to perform supplementary transmissions to the terminal, within a preset time duration after completion of M times of repeated transmissions of the terminal in the target configuration period is detected.

When the processor 400 executes the computer program, the processor 400 performs the following steps: sending the uplink dynamic scheduling information for instructing the terminal to perform supplementary transmissions to the terminal after the start of the first repeated transmission of the terminal in the uplink transmission is detected and before completion of M times of repeated transmissions of the terminal within the target configuration period is detected.

The number of times of supplementary transmissions is difference between the preset quantity of repeated-transmission times and the quantity of the times of repeated transmissions of the terminal in the target configuration period. The number of times of supplementary transmissions is configured by the base station or determined by the terminal based on the uplink dynamic scheduling information.

The transceiver 410 is configured for receiving and sending data under the control of the processor 400.

In FIG. 4, a bus architecture may include any number of interconnected buses and bridges, particularly, various circuits such as one or more processors represented by the processor 400 and a memory represented by the memory 420 are linked together. The bus architecture may also link various other circuits, such as peripheral devices, voltage regulators, and power management circuits, etc. which are well known in the art, and therefore will not be described further herein. A bus interface provides an interface. The transceiver 410 can be a number of elements, including a transmitter and a transceiver, providing a unit for communicating with various other devices over a transmission medium. The processor 400 is responsible for managing a bus architecture and general processing, and the memory 420 can store data used by the processor 400 in performing operations.

It can be understood by those skilled in the art that all or part of the steps for implementing the embodiments described above may be performed by means of hardware, or may also be performed by computer programs instructing associated hardware, the computer programs include instructions for performing some or all of the steps of the methods described above; and the computer programs can be stored in a readable storage medium, which may be any form of storage mediums.

The information transmission method at the base station side provided by the embodiment of the present disclosure is described above, and the information transmission method at the terminal side will be further described with reference to the accompanying drawings.

Figure 5:
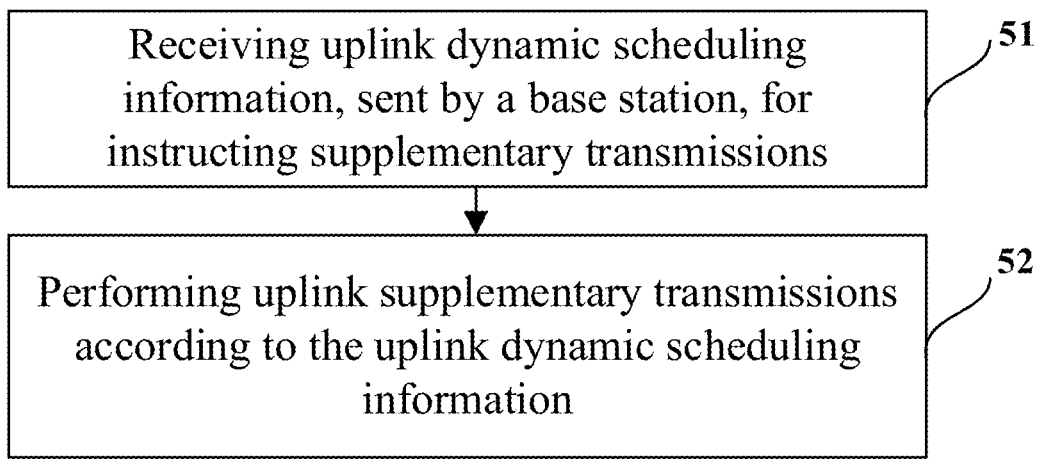
FIG. 5 shows a first flow chart of an information transmission method at a terminal side provided by an embodiment of the present disclosure.

As shown in FIG. 5, an embodiment of the present disclosure provides an information transmission method applied to a terminal, the method specifically includes the following steps 51-52.

Step 51: receiving uplink dynamic scheduling information, sent by a base station, for instructing supplementary transmissions.

The uplink dynamic scheduling information is sent by the base station under a condition that the quantity of times of repeated transmissions of the terminal in a target configuration period is less than the preset quantity of repeated-transmission times.

The uplink dynamic scheduling information includes an indication field for instructing supplementary transmissions, or the uplink dynamic scheduling information is associated with a target indication field in an RRC signaling, and the target indication field is used for instructing the terminal to perform supplementary transmissions.

Before the step 51, the method specifically includes: acquiring the quantity of the times of repeated transmissions in one configuration period configured by the base station.

Specifically, taking a configured PUSCH transmission as an example, when uplink grant-free repeated transmission is carried out, the terminal determines preset quantity K of times of repeated transmissions on a configured resource through a first parameter in the RRC signaling, wherein K is an integer greater than zero. For example: the first parameter may be a parameter in ConfiguredGrantConfig.

Specifically, when uplink repeated transmissions are carried out, the terminal determines the preset quantity J of times of repeated transmissions on a scheduling resource based on a second parameter in the RRC signaling, wherein J is an integer greater than zero. For example: the second parameter may be a parameter of a physical uplink shared channel-aggregation factor (pusch-AggregationFactor) in a physical uplink shared channel configuration (PUSCH-Config). To meet reliability requirements, a total of K times of repeated transmissions are required, each repeated transmission uses a similar spectral efficiency.

After acquiring the preset quantity of repeated-transmission times configured by the base station, a transmission occasion TO of the first repeated transmission in the target configuration period is determined according to arrival time of data, and M times of repeated transmissions are performed with a base station in the target configuration period, wherein M is the quantity of the times of repeated transmissions of the terminal in the target configuration period, and M is an integer greater than zero. A specific way of determining, by the terminal, the transmission occasion TO of the first repeated transmission in the target configuration period can be found in the Table 1 above.

The base station detects a position, in the target configuration period, of the transmission occasion of the first repeated transmission of the terminal in uplink transmission; and calculates the quantity of the times of repeated transmissions of the terminal in the target configuration period according to the position of the transmission occasion, and in a case that the quantity of times of repeated transmissions of the terminal in the target configuration period is less than the preset quantity of repeated-transmission times, the base station sends uplink dynamic scheduling information for indicating the terminal to perform supplementary transmissions to the terminal. Specifically, a process in which the base station calculates the quantity of the times of repeated transmissions of the terminal within the target configuration period has been described in the above described embodiment of the base station and will not be described in detail herein.

Step 52: performing uplink supplementary transmissions according to the uplink dynamic scheduling information.

Specifically, PUSCH supplementary transmissions may be performed according to the uplink dynamic scheduling information. Performing the uplink supplementary transmissions by the terminal means that the terminal supplements repeated transmissions to reach the preset quantity of repeated-transmission times, in a case that the quantity of the times of repeated transmissions of the terminal in the target configuration period is less than the preset quantity of repeated-transmission times. The quantity of the times of repeated transmissions of the terminal can the quantity, configured by the base station to the terminal, of times of repeated transmissions in one period.

The quantity of times of supplementary transmissions can be a difference value between the preset quantity of repeated-transmission times and the quantity of the times of repeated transmissions of the terminal in a target configuration period. The quantity of times of the supplementary transmissions may also be configured by the base station, or determined by the terminal based on the uplink dynamic scheduling information.

In the embodiment, the terminal receives the uplink dynamic scheduling information used for instructing supplementary transmissions, wherein the uplink dynamic scheduling information is sent by the base station according to the condition that the quantity of times of repeated transmissions of the terminal in the target configuration period is less than the preset quantity of repeated-transmission time; the terminal performs, according to the uplink dynamic scheduling information, uplink supplementary transmissions. In this way, when the quantity of transmission times in the target configuration period is less than the preset quantity of repeated-transmission times, supplementary transmissions is carried out through a dynamic scheduling of the base station, a situation that reliability of uplink transmission is influenced because the quantity of transmission times of the terminal in the target configuration period is less than the preset quantity of repeated-transmission times is avoided, and therefore the reliability of the URLLC service is guaranteed.

Figure 6:
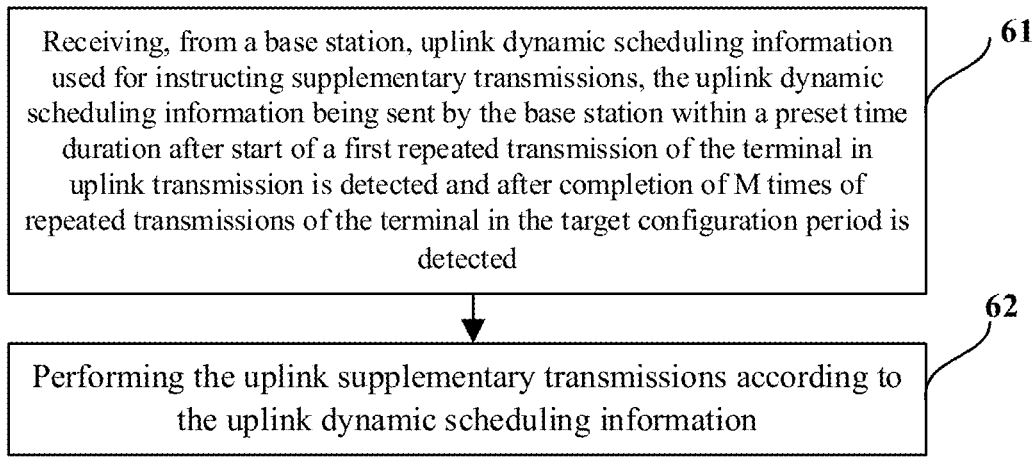
FIG. 6 shows a second flow chart of an information transmission method at the terminal side provided by an embodiment of the present disclosure.

As shown in FIG. 6, an embodiment of the present disclosure provides an information transmission method applied to the terminal, the method specifically includes the following steps 61-62.

Step 61: receiving, from a base station, uplink dynamic scheduling information used for instructing supplementary transmissions, the uplink dynamic scheduling information is sent by the base station within a preset time duration after start of a first repeated transmission of the terminal in uplink transmission is detected and after completion of M times of repeated transmissions of the terminal in the target configuration period is detected.

M is the number of times of repeated transmissions of the terminal in the target configuration period, and M is an integer greater than zero.

The uplink dynamic scheduling information includes an indication field for instructing supplementary transmissions, or the uplink dynamic scheduling information is associated with a target indication field in the RRC signaling, and the target indication field is used for instructing the terminal to perform supplementary transmissions.

The quantity of times of supplementary transmissions can be difference between the preset quantity of repeated-transmission times and the quantity of the times of repeated transmissions of the terminal in the target configuration period. The quantity of times of the supplementary transmissions may also be configured by the base station or determined by the terminal based on the uplink dynamic scheduling information. Specifically, the base station may configure the quantity of times of supplementary transmissions to the terminal by way of the RRC signaling or DCI. A specific process in which the base station sends the uplink dynamic scheduling information for instructing the supplementary transmissions has been described in the above embodiment of the base station and will not be described in detail herein.

Step 62: performing the uplink supplementary transmissions according to the uplink dynamic scheduling information.

Specifically, supplementary transmissions of PUSCHs can be performed.

The above step 61 is described below in connection with specific application scenarios.

Scenario 1: receiving uplink dynamic scheduling information for instructing supplementary transmissions, wherein the uplink dynamic scheduling information is sent by the base station within a preset time duration after completion of M times of repeated transmissions of the terminal in the target configuration period is detected.

Specifically, taking the preset quantity of repeated-transmission times is K, K=4 and RV={0 3 0 3} as an example, wherein elements 0, 1, 2, and 3 in the RV sequence represent different transmission schemes, and a time domain resource position is {an initial time domain symbol, the number of time domain symbols}, such as: the time domain symbols can be OFDM symbols. This time domain resource position is defined as one transmission occasion TO, which means one repeated transmission is completed, K=4 means that four TOs are required for four repeated transmissions. The TOs are typically continuous herein.

If an uplink data packet of the terminal arrives after a second transmission occasion TO and before a third transmission occasion TO in one configuration period, then the terminal will transmit a PUSCH with RV=0 on the third transmission occasion TO (i.e. TO2 in FIG. 9), transmit a PUSCH with RV=3 on a fourth transmission occasion TO (i.e. TO3 in FIG. 9). The base station blindly detects the PUSCHs. Normally, the PUSCHs with RV=0 and RV=3 should be detected on the third transmission occasion TO and the fourth transmission occasion TO.

The base station can knows that the times M of repeated transmissions actually completed by the terminal in the target configuration period is 2 (M=2), according to the detected transmission occasion of the first repeated transmission, namely TO2. The base station and the terminal know the quantity of the times of supplementary repeated transmissions by: calculating that the quantity of times of supplementary repeated transmissions required to be performed is N=K−M=2 according to the configured quantity K of times of repeated transmissions (K=4) in one configuration period and the quantity M of times of repeated transmissions (M=2) actually completed in the target configuration period.

The base station selects a sending time moment to send an uplink grant (UL grant) for scheduling the terminal to perform the supplementary transmissions of PUSCHs. The sending time moment is the moment when the base station considers that M times of repeated transmissions of the terminal in the target configuration period are completed, or is within a preset time duration after the terminal completes M times of repeated transmissions in the target configuration period. In this way, when the terminal completes the M times of repeated transmissions in the target configuration period, or within the preset time duration after the terminal completes the M times of repeated transmissions in the target configuration period, the terminal continuously performs supplementary repeated transmissions on scheduled resources according to instruction information of the UL grant and an obtained quantity of times of supplementary repeated transmissions, wherein the quantity N of times of supplementary repeated transmissions is 2 (N=2) calculated in advance. The preset time duration is set for being distinguished from uplink dynamic scheduling information used for instructing retransmission or uplink dynamic scheduling information used for instructing dynamic transmission.

Of course, the quantity of times of the supplementary transmissions may also be configured by the base station, or determined by the terminal based on the uplink dynamic scheduling information. The base station may configure the quantity L of times of supplementary repeated transmissions to the terminal through the RRC signaling or DCI. The L is an integer greater than zero. In this way, when the terminal completes the M times of repeated transmissions in the target configuration period, or within the preset time duration after the terminal completes the M times of repeated transmissions in the target configuration period, the terminal continues to perform the supplementary repeated transmissions on the scheduled resources according to the configured quantity of times of supplementary repeated transmissions or according to the quantity of times of supplementary repeated transmissions determined by the uplink dynamic scheduling information.

Typically, after the terminal transmits M=2 repeated transmissions on two configured transmission occasions TOs, two repeated transmissions are completed in the first and the second supplementary repeated transmissions using RV=0 and RV=3, respectively.

In the embodiment, within a preset time duration after the terminal completes M repeated transmissions in the target configuration period, the terminal continues to perform the supplementary repeated transmissions on a scheduled resource according to uplink dynamic scheduling information sent by the base station for instructing the terminal to perform supplementary transmissions. In this way, it may be avoided that a condition that a quantity of transmission times of the terminal in the target configuration period is less than the preset quantity of repeated-transmission times affects reliability of uplink transmission, and the M times of repeated transmissions of the terminal in the target configuration period are not influenced, consequently, the reliability of the URLLC service is guaranteed.

Scenario 2: receiving uplink dynamic scheduling information from a base station for instructing supplementary transmissions, wherein the uplink dynamic scheduling information is sent by the base station after the base station detects that the first repeated transmission of the terminal in uplink transmission is started and before the M times of repeated transmissions of the terminal within the target configuration period is completed.

Specifically, taking the preset quantity of repeated-transmission times is K, K=4 and RV={0 3 0 3} as an example, wherein elements 0, 1, 2, and 3 in the RV sequence represent different transmission schemes, and a time domain resource position is {an initial time domain symbol, the number of time domain symbols}, such as: the time domain symbols can be OFDM symbols. This time domain resource position is defined as one transmission occasion TO, which means one repeated transmission is completed, K=4 means that four TOs are required for four repeated transmissions. The TOs are typically continuous herein.

If an uplink data packet of the terminal arrives after the second transmission occasion TO and before the third transmission occasion TO in one configuration period, then the terminal will transmit a PUSCH with RV=0 on the third transmission occasion TO (i.e. TO2 in FIG. 10), transmit a PUSCH with RV=3 on a fourth transmission occasion TO (i.e. TO3 in FIG. 10). The base station blindly detects the PUSCHs. Normally, the PUSCHs with RV=0 and RV=3 should be detected on the third transmission occasion TO and the fourth transmission occasion TO.

The base station can knows the quantity M of times of repeated transmissions actually completed by the terminal in the target configuration period is 2 (M=2), according to the detected transmission occasion of the first repeated transmission, namely TO2. The base station and the terminal know the quantity of times of supplementary repeated transmissions by: calculating that the quantity of times of supplementary repeated transmissions required to be performed is N=K−M=2 according to the configured quantity K of times of repeated transmissions (K=4) in one configuration period and the quantity M of times of repeated transmissions (M=2) actually completed in the target configuration period.

The base station selects a sending time moment to send a UL grant for scheduling the terminal to perform supplementary transmissions of PUSCHs. The sending time moment is the moment when the base station detects the first repeated transmission or after the base station detects the first repeated transmission and before M times of repeated transmissions of the terminal in the target configuration period are completed. In this way, in a process of performing the M times of repeated transmissions in the target configuration period by the terminal, the terminal simultaneously performs supplementary repeated transmissions on scheduled resources according to instruction information of the UL grant and the obtained quantity of times of supplementary repeated transmissions, the quantity N of times of supplementary repeated transmissions is 2 (N=2) calculated in advance.

Of course, the quantity of times of the supplementary transmissions may also be configured by the base station, or determined by the terminal based on the uplink dynamic scheduling information. The base station may configure the quantity L of times of supplementary repeated transmissions to the terminal through the RRC signaling or DCI. The L is an integer greater than zero. In this way, in a process of performing the M times of repeated transmissions in the target configuration period by the terminal, the terminal simultaneously performs the supplementary repeated transmissions on the scheduled resources according to the configured quantity of times of supplementary repeated transmissions or according to the quantity of times of supplementary repeated transmissions determined by the uplink dynamic scheduling information.

Typically, after the terminal transmits M=2 repeated transmissions on two configured transmission occasions TOs, two repeated transmissions are completed in the first and the second supplementary repeated transmissions using RV=0 and RV=3, respectively.

In the embodiment, in the process that the terminal performs M repeated transmissions in the target configuration period, the terminal continues to perform the supplementary repeated transmissions on a scheduled resource according to uplink dynamic scheduling information sent by the base station for instructing the terminal to perform supplementary transmissions. In this way, it may be avoided that a condition that a quantity of transmission times of the terminal in the target configuration period is less than the preset quantity of repeated-transmission times affects reliability of uplink transmission, and consequently, the reliability of the URLLC service is guaranteed, and delay of uplink transmission may also be prevented.

In the above technical solutions, uplink dynamic scheduling information for instructing supplementary transmissions is received by the terminal from the base station, the uplink dynamic scheduling information is sent by the base station under a condition that the quantity of the times of repeated transmissions of the terminal in the target configuration period is less than the preset quantity of repeated-transmission times; and the terminal performs uplink supplementary transmission according to the uplink dynamic scheduling information, so that under a condition that the quantity of the times of repeated transmissions in the target configuration period is less than the preset quantity of repeated-transmission times, the terminal performs supplementary transmissions based on dynamic scheduling from the base station, and it is avoided that reliability of uplink transmission is influenced by the condition that the quantity of transmission times of the terminal in the target configuration period is less than the preset quantity of repeated-transmission times, consequently, the reliability of the URLLC service is guaranteed.

The information transmission method is described in the embodiment provided by the present disclosure, the terminal corresponding to the information transmission method will be further described with reference to the accompanying drawings.

Figure 7:
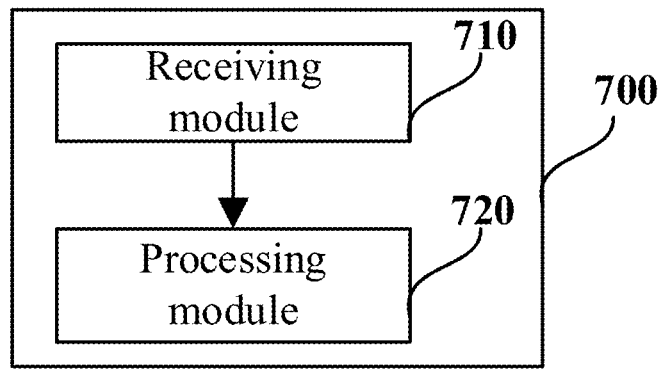
FIG. 7 shows a structural schematic diagram of modules of a terminal provided by an embodiment of the present disclosure.

As shown in FIG. 7, an embodiment of the present disclosure provides an terminal 700. The terminal 700 includes a receiving module 710 and a processing module 720.

The receiving module 710 is configured for receiving, from a base station, uplink dynamic scheduling information for instructing supplementary transmissions; wherein, the uplink dynamic scheduling information is sent by the base station under a condition that the quantity of times of repeated transmissions of the terminal in the target configuration period is less than a preset quantity of repeated-transmission times. The processing module 720 is configured for performing uplink supplementary transmissions according to the uplink dynamic scheduling information.

The uplink dynamic scheduling information includes an indication field for instructing supplementary transmissions.

The uplink dynamic scheduling information is associated with a target indication field in the RRC signaling, and the target indication field is used for instructing the terminal to perform supplementary transmissions.

The receiving module 710 includes a receiving submodule. The receiving submodule is used for receiving uplink dynamic scheduling information used for instructing supplementary transmissions, wherein the uplink dynamic scheduling information is sent by the base station within a preset time duration after start of a first repeated transmission of the terminal in uplink transmission is detected and after completion of M times of repeated transmissions of the terminal in the target configuration period is detected. M is the number of times of repeated transmissions of the terminal in the target configuration period, and M is an integer greater than zero.

The receiving submodule includes a first receiving unit, the first receiving unit is configured for receiving uplink dynamic scheduling information for instructing supplementary transmissions, the uplink dynamic scheduling information is sent by the base station within a preset time duration after completion of M times of repeated transmissions of the terminal in the target configuration period is detected.

The receiving submodule includes a second receiving unit, the second receiving unit is configured for receiving uplink dynamic scheduling information used for instructing supplementary transmissions, the uplink dynamic scheduling information is sent by the base station after start of the first repeated transmission of the terminal in the uplink transmission is detected and before completion of the M times of repeated transmissions of the terminal in the target configuration period is detected.

A quantity of the times of supplementary transmissions is a difference value between the preset quantity of repeated-transmission times and a quantity of times of repeated transmissions of the terminal in the target configuration period.

The quantity of times of supplementary transmissions is configured by the base station, or determined by the terminal according to the uplink dynamic scheduling information.

The embodiment of the terminal in the present disclosure corresponds to the embodiment of the method, all implementations in the embodiment of the method are suitable for the embodiment of the terminal, and the same technical effect can be achieved.

In the terminal 700 in the above embodiment, uplink dynamic scheduling information for instructing supplementary transmissions is received by the terminal from the base station, the uplink dynamic scheduling information is sent by the base station under a condition that the quantity of the times of repeated transmissions of the terminal in the target configuration period is less than the preset quantity of repeated-transmission times; and the terminal performs uplink supplementary transmission according to the uplink dynamic scheduling information, so that under a condition that the quantity of the times of repeated transmissions in the target configuration period is less than the preset quantity of repeated-transmission times, the terminal performs supplementary transmissions based on dynamic scheduling from the base station, and it is avoided that reliability of uplink transmission is influenced by the condition that the quantity of transmission times of the terminal in the target configuration period is less than the preset quantity of repeated-transmission times, consequently, the reliability of the URLLC service is guaranteed.

Figure 8:
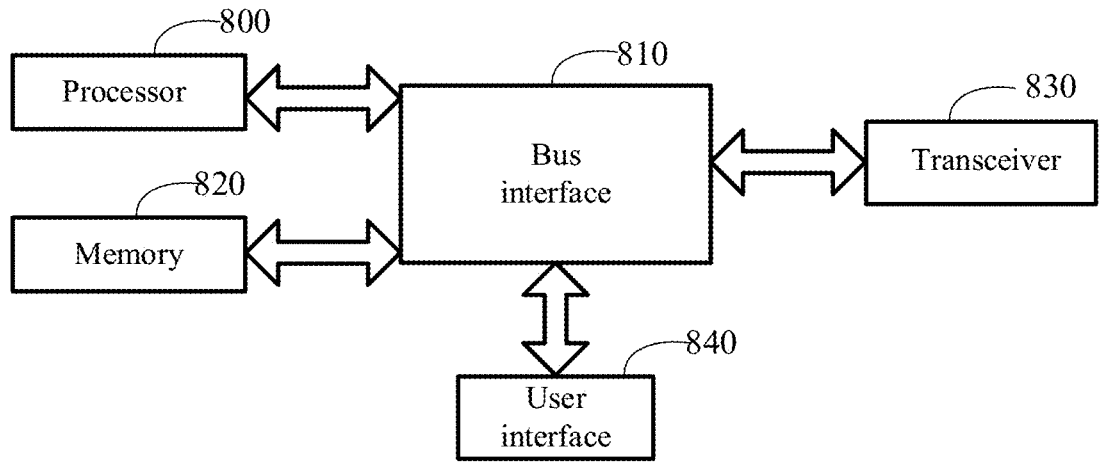
FIG. 8 shows a block diagram of a terminal in the present disclosure.

As shown in FIG. 8, an embodiment of the present disclosure provides a terminal. The terminal includes a processor 800, and a memory 820 connected to the processor 800 via a bus interface, the memory 820 is configured to store programs and data used by the processor 800 in performing operations; when the processor 800 calls and executes the programs and data stored in the memory 820, the following steps are executed: receiving, from a base station, uplink dynamic scheduling information for instructing supplementary transmissions; wherein, the uplink dynamic scheduling information is sent by the base station under a condition that the quantity of times of repeated transmissions of the terminal in the target configuration period is less than a preset quantity of repeated-transmission times; and performing uplink supplementary transmissions according to the uplink dynamic scheduling information.

A transceiver 830 is connected to the bus interface 810 and is configured for receiving and sending data under the control of the processor 800.

The uplink dynamic scheduling information includes an indication field for instructing supplementary transmissions.

The uplink dynamic scheduling information is associated with a target indication field in an RRC signaling, and the target indication field is used for instructing the terminal to perform supplementary transmissions.

When the processor 800 executes the computer programs, the processor 800 performs the following steps: receiving uplink dynamic scheduling information used for instructing supplementary transmissions, wherein the uplink dynamic scheduling information is sent by the base station within a preset time duration after start of a first repeated transmission of the terminal in uplink transmission is detected and after completion of M times of repeated transmissions of the terminal in the target configuration period is detected. M is the number of times of repeated transmissions of the terminal in the target configuration period, and M is an integer greater than zero.

When the processor 800 executes the computer programs, the processor 800 performs the following steps: receiving uplink dynamic scheduling information for instructing supplementary transmissions, the uplink dynamic scheduling information is sent by the base station within a preset time duration after completion of M times of repeated transmissions of the terminal in the target configuration period is detected.

When the processor 800 executes the computer programs, the processor 800 performs the following steps: receiving uplink dynamic scheduling information used for instructing supplementary transmissions, the uplink dynamic scheduling information is sent by the base station after start of the first repeated transmission of the terminal in the uplink transmission is detected and before completion of the M times of repeated transmissions of the terminal in the target configuration period is detected.

A quantity of the times of supplementary transmissions is a difference value between the preset quantity of repeated-transmission times and a quantity of times of repeated transmissions of the terminal in the target configuration period.

The quantity of times of supplementary transmissions is configured by the base station, or determined by the terminal according to the uplink dynamic scheduling information.

It should be noted that, in FIG. 8, a bus architecture may include any number of interconnected buses and bridges, particularly, various circuits such as one or more processors represented by the processor 800 and a memory represented by the memory 820 are linked together. The bus architecture may also link various other circuits, such as peripheral devices, voltage regulators, and power management circuits, etc. which are well known in the art, and therefore will not be described further herein. A bus interface provides an interface. The transceiver 830 can be a number of elements, including a transmitter and a transceiver, providing a unit for communicating with various other devices over a transmission medium. For different terminals, a user interface 840 may also be an interface capable of connecting with an internal device or an external device. The connected devices may include, but are not limited to, a keypad, a display, a speaker, a microphone, a joystick. The processor 800 is responsible for managing a bus architecture and general processing, and the memory 820 can store data used by the processor 800 in performing operations.

It can be understood by those skilled in the art that all or part of the steps for implementing the embodiments described above may be performed by means of hardware, or may also be performed by computer programs instructing associated hardware, the computer programs include instructions for performing some or all of the steps of the methods described above; and the computer programs can be stored in a readable storage medium, which may be any form of storage mediums.

In addition, in the devices and methods of the present disclosure, it is apparent that components or steps can be disassembled and/or recombined. Such disassembled and/or reassembled components or steps should be seen as equivalent solutions of the present disclosure. Also, steps for performing the above series of steps may naturally be performed in an order illustrated chronologically, but need not necessarily be performed chronologically, and some steps can be performed in parallel or independently of one another. It may be understood that some or all steps of the methods and some or all components of the devices of the present disclosure may be implemented in any computing device (including a processor, a storage and the like) or a network of computing devices by using hardware, firmware, software or a combination thereof, which is easily achievable by those skill in the art using their basic programming skills after reading the description of the present disclosure.

Therefore, the objectives of the present disclosure may also be achieved by running a program or a set of programs on any computing device. The computing device can be a known general device. Therefore, the objectives of the present disclosure may also be achieved by providing only program products containing program codes which implements the methods or devices. That is to say, such program products also constitute the present disclosure, and a storage medium storing such program products also constitutes this disclosure. Obviously, the storage medium may be any known storage medium or any storage medium developed in the future. It should also be noted that, in the devices and methods of the present disclosure, it is apparent that the components or the steps can be disassembled and/or recombined. The disassembling and/or recombination should be considered as equivalents of the present disclosure. Also, the steps for performing the above series of steps may naturally be performed in the order illustrated chronologically, but need not necessarily be performed chronologically. Some steps can be performed in parallel or independently of one another.

The above description are optional embodiments of the present disclosure. It should be noted that, for those skilled in the art, various changes and embellishments can be made without departing from the principles of the disclosure. Such changes and embellishments are also within a protection scope of the present disclosure.

What is claimed is:

1. An information transmission method performed by a base station, comprising:
   acquiring a quantity of times of repeated transmissions of a terminal in a target configuration period;
   sending, to the terminal, uplink dynamic scheduling information for instructing supplementary transmissions, if the quantity of times of repeated transmissions is less than a preset quantity of repeated-transmission times, wherein the uplink dynamic scheduling information is associated with a target indication field in radio resource control (RRC) signaling, the target indication field is used for instructing the terminal to perform the supplementary transmissions.

2. The information transmission method according to claim 1, wherein sending, to the terminal, the uplink dynamic scheduling information for instructing the supplementary transmissions, comprises:

sending, to the terminal, the uplink dynamic scheduling information for instructing the supplementary transmissions, within a preset time duration after start of a first repeated transmission of the terminal in uplink transmission is detected and after completion of M times of repeated transmissions of the terminal in the target configuration period is detected, wherein M is the quantity of times of repeated transmissions of the terminal in the target configuration period, and M is an integer greater than zero.

3. The information transmission method according to claim 2, wherein sending, to the terminal, the uplink dynamic scheduling information for instructing the supplementary transmissions within the preset time duration after the start of the first repeated transmission of the terminal in uplink transmission is detected and after the completion of the M times of repeated transmissions of the terminal in the target configuration period is detected, comprises:

sending, to the terminal, the uplink dynamic scheduling information for instructing the supplementary transmissions in the preset time duration after completion of the M times of repeated transmissions in the target configuration period is detected; or sending, to the terminal, the uplink dynamic scheduling information for instructing the supplementary transmissions after the start of the first repeated transmission of the terminal in the uplink transmission is detected and before the completion of M times of repeated transmissions of the terminal in the target configuration period is detected.

4. The information transmission method according to claim 1, wherein, a quantity of times of the supplementary transmissions is a difference value between the preset quantity of repeated-transmission times and the quantity of times of repeated transmissions of the terminal in the target configuration period; or a quantity of times of the supplementary transmissions is configured by the base station, or determined by the terminal according to the uplink dynamic scheduling information.

5. A base station, comprising:

a transceiver, a memory, a processor and a computer program stored on the memory and executable by the processor, wherein, when the processor executes the computer program, the processor performs steps of the information transmission method according to claim 1.

6. The base station according to claim 5, wherein when the processor executes the computer program, the processor performs following steps:

sending, to the terminal, the uplink dynamic scheduling information for instructing the supplementary transmissions, within a preset time duration after start of a first repeated transmission of the terminal in uplink transmission is detected and after completion of M times of repeated transmissions of the terminal in the target configuration period is detected, wherein M is the quantity of times of repeated transmissions of the terminal in the target configuration period, and M is an integer greater than zero.

7. The base station according to claim 6, wherein when the processor executes the computer program, the processor performs following steps:

sending, to the terminal, the uplink dynamic scheduling information for instructing the supplementary transmissions, in the preset time duration after completion of the M times of repeated transmissions in the target configuration period is detected; or sending, to the terminal, the uplink dynamic scheduling information for instructing the supplementary transmissions, after the start of the first repeated transmission of the terminal in the uplink transmission is detected and before the completion of M times of repeated transmissions of the terminal in the target configuration period is detected.

8. An information transmission method performed by a terminal, comprising:

receiving, from a base station, uplink dynamic scheduling information for instructing supplementary transmissions wherein the uplink dynamic scheduling information is sent by the base station under a condition that a quantity of times of repeated transmissions of the terminal in the target configuration period is less than a preset quantity of repeated-transmission times;

performing uplink supplementary transmissions according to the uplink dynamic scheduling information, wherein the uplink dynamic scheduling information is associated with a target indication field in radio resource control (RRC) signaling, and the target indication field is used for instructing the terminal to perform the supplementary transmissions.

9. The information transmission method according to claim 8, wherein, receiving, from the base station, the uplink dynamic scheduling information for instructing the supplementary transmissions, comprises:

receiving the uplink dynamic scheduling information for instructing the supplementary transmissions, the uplink dynamic scheduling information being sent by the base station within a preset time duration after start of a first repeated transmission of the terminal in uplink transmission is detected and after completion of M times of repeated transmissions of the terminal in the target configuration period is detected;

wherein M is the quantity of times of repeated transmissions of the terminal in the target configuration period, and M is an integer greater than zero.

10. The information transmission method according to claim 9, wherein, receiving the uplink dynamic scheduling information for instructing the supplementary transmissions, the uplink dynamic scheduling information being sent by the base station within the preset time duration after the start of the first repeated transmission of the terminal in uplink transmission is detected and after the completion of the M times of repeated transmissions of the terminal in the target configuration period is detected, comprises:

receiving the uplink dynamic scheduling information for instructing the supplementary transmissions, the uplink dynamic scheduling information being sent by the base station in the preset time duration after completion of the M times of repeated transmissions in the target configuration period is detected; or receiving the uplink dynamic scheduling information for instructing the supplementary transmissions, the uplink dynamic scheduling information being sent by the base station after the start of the first repeated transmission of the terminal in the uplink transmission is detected and before the completion of M times of repeated transmissions of the terminal in the target configuration period is detected.

11. The information transmission method according to claim 8, wherein, a quantity of times of the supplementary transmissions is a difference value between the preset quantity of repeated-transmission times and the quantity of times of repeated transmissions of the terminal in the target configuration period; or a quantity of times of the supplementary transmissions is configured by the base station, or determined by the terminal according to the uplink dynamic scheduling information.

12. A terminal, comprising:

a transceiver, a memory, a processor and a computer program stored on the memory and executable by the processor, wherein, when the processor executes the computer program, the processor performs the following steps:

receiving, from a base station, uplink dynamic scheduling information for instructing supplementary transmissions wherein the uplink dynamic scheduling information is sent by the base station under a condition that a quantity of times of repeated transmissions of the terminal in the target configuration period is less than a preset quantity of repeated-transmission times;

performing uplink supplementary transmissions according to the uplink dynamic scheduling information, wherein the uplink dynamic scheduling information is associated with a target indication field in an RRC signaling, and the target indication field is used for instructing the terminal to perform the supplementary transmissions.

13. The terminal according to claim 12, wherein, when the processor executes the computer program, the processor performs the following steps:

receiving the uplink dynamic scheduling information for instructing the supplementary transmissions, the uplink dynamic scheduling information being sent by the base station within a preset time duration after start of a first repeated transmission of the terminal in uplink transmission is detected and after completion of M times of repeated transmissions of the terminal in the target configuration period is detected;

wherein M is the quantity of times of repeated transmissions of the terminal in the target configuration period, and M is an integer greater than zero.

14. The terminal according to claim 13, wherein, when the processor executes the computer program, the processor performs the following steps:

receiving the uplink dynamic scheduling information for instructing the supplementary transmissions, the uplink dynamic scheduling information being sent by the base station in the preset time duration after completion of the M times of repeated transmissions in the target configuration period is detected; or receiving the uplink dynamic scheduling information for instructing the supplementary transmissions, the uplink dynamic scheduling information being sent by the base station after the start of the first repeated transmission of the terminal in the uplink transmission is detected and before the completion of M times of repeated transmissions of the terminal in the target configuration period is detected.

* * * * *